(12) United States Patent
Seo (10) Patent No.: US 7,106,796 B2
(45) Date of Patent: Sep. 12, 2006

(54) APPARATUS AND METHOD FOR ADAPTIVELY CONTROLLING BIT RATE OF VIDEO TRANSCODER

(75) Inventor: Kwang-Deok Seo, Gyunggi-Do (KR)

(73) Assignee: LG Electronics Inc., Seoul (KR)

( * ) Notice: Subject to any disclaimer, the term of this patent is extended or adjusted under 35 U.S.C. 154(b) by 437 days.

(21) Appl. No.: 10/420,789

(22) Filed: Apr. 23, 2003

(65) Prior Publication Data

US 2004/0081236 A1 Apr. 29, 2004

(30) Foreign Application Priority Data

Oct. 24, 2002 (KR) .................... 10-2002-0065319

(51) Int. Cl.
*H04N 7/18* (2006.01)
(52) U.S. Cl. .................... 375/240.03; 375/240.04; 375/240.05
(58) Field of Classification Search ............... 375/240.01–240.29
See application file for complete search history.

(56) References Cited

U.S. PATENT DOCUMENTS 6,490,320 B1 * 12/2002 Vetro et al. ............ 375/240.08

2003/0007558 A1 * 1/2003 Vetro et al. ............ 375/240.03

OTHER PUBLICATIONS

Seo, Kwang-deok, Seong-cheol HEO and Jae-kyoon KIM, "A Rate Control Algorithm Based on Adaptive R-Q Model for MPEG-1 to MPEG-4 Transcoding in DCT Domain," IEEE International Conference on Communications, Apr. 28-May 2, 2002, New York, NY, vol. 1. pp. 109-113.

* cited by examiner

*Primary Examiner*—Andy Rao
(74) *Attorney, Agent, or Firm*—Fleshner & Kim, LLP (57) ABSTRACT

Apparatus and method for adaptively controlling a bit rate of a video transcoder are disclosed. Logarithmic R-Q characteristics obtaining the adaptive R-Q characteristics suitable to characteristics of an inputted image are proposed, and the parameter ($\beta$) compensating the difference between the coding efficiency of MPEG-1 and the coding efficiency of MPEG-4 is not fixed as a specific value but changed adaptively according to the characteristics of an image. Accordingly, an accurate quantization parameter of MPEG-4 is generated. Thus, on the basis of the proposed concepts, the bit rate is adaptively controlled when the bit stream of MPEG-1 is converted into a bit stream of MPEG-4, so that the picture quality (PSNR) can be heightened and more accurate output bit rate can be obtained.

32 Claims, 9 Drawing Sheets

BACKGROUND ART

|  | AVERAGE PSNR(dB) | GENERATED BIT-R |
|---|---|---|
| TM5 FOR ORIGINAL MPEG-1 | 26.47 | 1.006 |
| PREVIOUS RATE CONTROL | 25.70 | 0.963 |
| PROPOSED RATE CONTROL | 25.95 | 1.002 |

FIG. 14B

|  | AVERAGE PSNR(dB) | GENERATED BIT-RATE(Mbps) |
|---|---|---|
| TM5 FOR ORIGINAL MPEG-1 | 29.28 | 602.3 |
| PREVIOUS RATE CONTROL | 28.38 | 578.4 |
| PROPOSED RATE CONTROL | 28.67 | 597.0 |

APPARATUS AND METHOD FOR ADAPTIVELY CONTROLLING BIT RATE OF VIDEO TRANSCODER

BACKGROUND OF THE INVENTION

1. Field of the Invention

The present invention relates to bit rate conversion of a video transcoder and, more particularly, to an apparatus and method for adaptively controlling logarithmic R-Q model-based bit rate.

2. Description of the Background Art

With the advent of a video compression technology, digital video signal can be transmitted through diverse types of channels including the Internet, a radio network and an ATM network. Therefore, a future video service should take is a heterogeneous video coding standard, as well as a heterogeneous network environment, into account.

Up to now, MPEG-1 has been used as a general video coding standard for a digital storage medium and CD-ROM application and numerous video contents are created to an MPEG-1 bit stream. As video transmission at a low bit rate such as a moving environment is in increasingly demand, an MPEG-4 has been introduced as one of main stream techniques resistant to a channel error.

Having a bit rate of about 1.5 Mbit, the MPEG-1 is not suitable for a radio environment which requests a low bit rate. In comparison, the MPEG-4 has a high compression rate and adopts various error-resistance techniques, so that it is suitable for a radio environment with a high error rate and low channel band width.

Therefore, by transcoding the MPEG-1 video contents stored in a server to the MPEG-4 with the low bit rate, various video contents can be effectively transmitted from the server to a mobile terminal having an MPEG-4 decoder through a radio environment. As a related substantial application field, a VOD (Video on Demand) or a streaming video service allows the mobile terminal with the MPEG-4 to receive MPEG-1 video contents which has been previously compressed and stored.

In order to provide such service, the high bit rate of the MPEG-1 which has been previously compressed and stored should be converted into an MPEG-4 bit stream of a low bit rate as requested by the mobile terminal with the MPEG-4, for which a video transcoder is proposed to perform the conversion operation.

Figure 1:
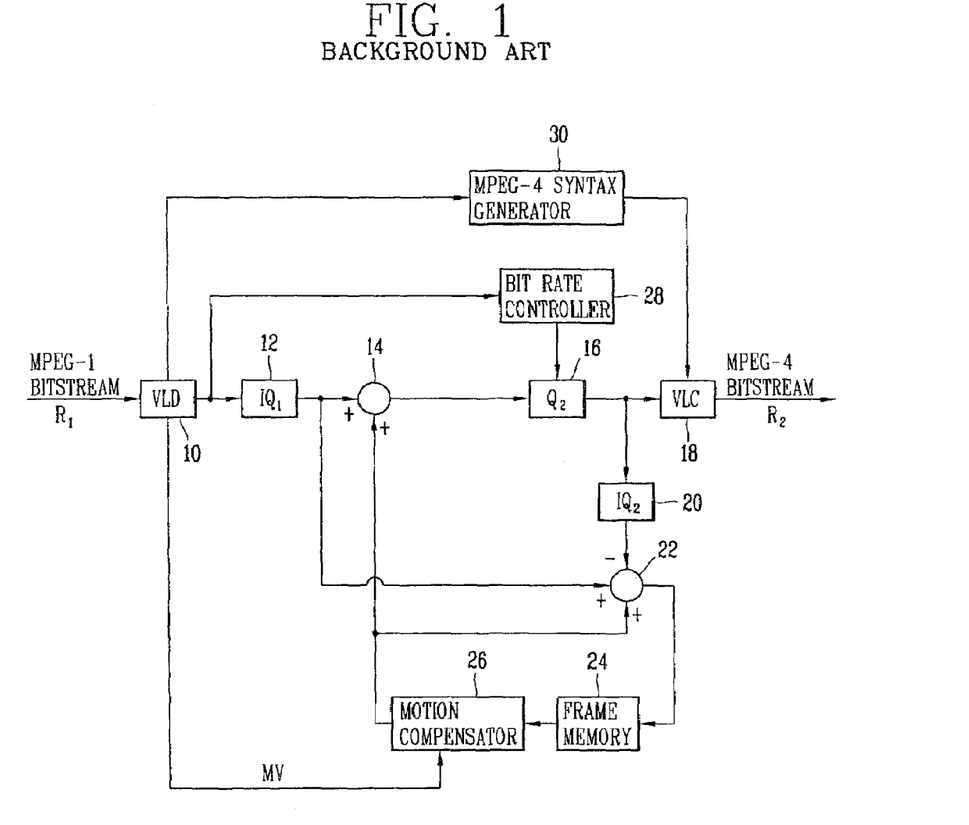
FIG. 1 is a schematic block diagram of a video transcoder in accordance with a conventional art.

FIG. 1 illustrates a structure of a conventional video transcoder for the bit rate conversion.

With reference to FIG. 1, the conventional video transcoder includes a variable length decoder (VLD) 10, an inverse quantizer ($IQ_1$) 12, an adder 14, a quantizer 16, a variable length coder (VLC) 18, an inverse quantizer ($IQ_2$) 20, an adder 22, a frame memory 24, a motion compensator 26, a bit rate controller 28 and an MPEG-4 syntax generator 30.

The VLD 10 decodes an MPEG-1 bit stream with a bit rate (R1), and outputs a quantization parameter (QP) and a DCT coefficient.

The inverse quantizer 12 inversely quantizes the DCT coefficient to a quantization parameter (QP) and outputs it to the adder 14. Then, the adder 14 adds the motion compensation value at the DCT domain outputted from the motion compensator 26 and the DCT coefficient outputted from the inverse quantizer 12.

The quantizer 16 quantizes the DCT coefficient outputted from the adder 14 with the quantization parameter (QP) outputted from the bit rate controller 28, and outputs it to the VLC 18. Then, the VLC 18 codes the quantized DCT coefficient with the MPEG-4 syntax outputted from the syntax generator 28 and outputs an MPEG-4 bit stream with a bit rate (R2).

At this time, the motion compensator 26 generates a motion compensation value at the DCT domain by using the motion vector (MV) outputted from the VLD 10 and a reference DCT frame stored in the frame memory 24, and the adder 22 subtracts the outputs of the inverse quantizers 12 and 20 and adds the corresponding subtraction value to the motion compensation value to generate a reference frame to be stored in the frame memory 24. The MPEG-4 syntax generator 30 generates an MPEG-4 syntax from the MPEG-1 bit stream.

In this manner, the video transcoder transcodes the MPEG-1 bit stream with the high bit rate (R1) to the MPEG-4 bit stream with the low bit rate (R2), and a target bit rate of the MPEG-4 is performed under the control of the bit rate controller 28.

The bit rate controller 28 receives the quantization parameter (QP) of the MPEG-1 which has been decoded in the VLD 10 and outputs a quantization parameter for controlling the bit rate of the MPEG-4 to the quantizer 16.

The up-to-date method for controlling the bit rate of the MPEG-4 by the bit rate controller of the video transcoder is 'a new requantization method for MPEG-1 to MPEG-4 transcoder' disclosed in pages 13–16 of an article presented by S. C. Heo, K. D. Seo, K. C. Roh and J. K. Kim in the IEEE ICME (IEEE Int. Conf. On Multimedia and Expo 2001) held in Tokyo.

In the above article, two steps are formed to control the bit rate of MPEG-4. First step is determining a suitable quantization parameter on the basis of an existing general R-Q (rate-quantization) model, and the second step is finally obtaining a quantization parameter of MPEG-4 in consideration of difference between a compression efficiency and quantization method of MPEG-1 and those of MPEG-4.

Figure 2:
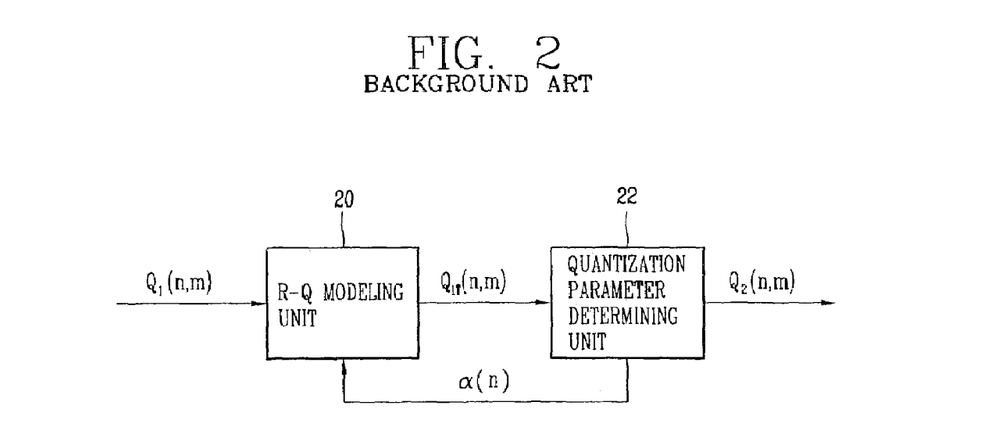
FIG. 2 illustrates a detailed construction of a bit rate controller of FIG. 1.

FIG. 2 is a block diagram of a bit rate controller for controlling a bit rate of MPEG-4 in accordance with the conventional art.

With reference to FIG. 2, the conventional bit rate controller includes an R-Q modeling unit 20 and a quantization parameter determining unit 22.

The R-Q modeling unit 20 calculates a target quantization parameter $[Q_{1T}(n,m)]$ of MPEG-1 by adopting an R-Q model to the inputted quantization parameter $[Q_1(n,m)]$ of MPEG-1. In this case, 'n' indicates an order of pictures and 'm' indicates an index representing the order of macro blocks in the picture. The R-Q (rate-quantization) model has been proposed by Ding in IEEE Trans. On circuits and systems for video technology, February 1997.

The quantization parameter determining unit 22 receives the target quantization parameter $[Q_{1T}(n,m)]$ and calculates a quantization parameter $[Q_2(n,m)]$ of MPEG-4 to obtain a bit rate of MPEG-4 in consideration of the difference in the coding efficiency between MPEG-1 and MPEG-4 and coding and the difference of the coding methods of the quantization parameter between two coding standards.

That is, the coding efficiency of MPEG-4 is better than that of MPEG-1 by about 10–20%. Thus, in order to reflect the coding efficiency, β parameter has been introduced to the quantization parameter determining unit to reflect the coding efficiency. In addition, in case of MPEG-4, in order to prevent a rapid change of picture quality, a changeable value of the quantization parameter between neighboring macro blocks is limited to ±2, while there is no such limitation in MPEG-1.

Thus, in order to resolve such difference, the quantization parameter determining unit 22 uses an gradual approach function (GAF).

The quantization parameter determining unit 22 calculates a quantization parameter [$Q_2(n,m)$] for MPEG-4 by adopting the β parameter and the GAF to the target quantization parameter [$Q_{1T}(n,m)$]. In addition, the quantization parameter determining unit 22 detects α(n) indicating a difference between a target bit rate per 1 frame and an actually generated bit count and feed it back to the R-Q modeling unit 20. Then, the R-Q modeling unit 20 increases or decreases bit count transmission as much as α(n) in the next frame.

Accordingly, the quantizer 16 quantizes the DCT coefficient outputted from the adder 14 with the quantization parameter [$Q_2(n,m)$], thereby obtaining a target bit rate of MPEG-4.

As mentioned above, the bit rate controller obtains the target quantization parameter [$Q_{1T}(n,m)$] by adopting the R-Q model to the quantization parameter [$Q_1(n,m)$] of MPEG-1. However, the R-Q modeling unit of the bit rate controller uses only the fixed R-Q model without considering characteristics of an input image.

That is, the conventional bit rate controller has a problem that it uses a fixed model that is not changeable regardless of an image for the R-Q model, a core of a bit rate control algorithm, it can not control accurately the bit rate. Because of this problem, an accurate bit rate is not assigned to each picture, resulting in that a picture quality is degraded or picture quality between pictures is provided a method for adaptively controlling a bit rate of a video transcoder including the steps of: converting a bit stream of MPET-1 into a DCT coefficient; generating a quantization parameter of MPEG-4 by reflecting a difference of a logarithmic R-Q model and a coding efficiency for a quantization parameter of MPEG-1; quantizing the DCT coefficient with the generated quantization parameter of MPEG-4 and outputting an MPEG-4 bit stream.

In the method for adaptively controlling a bit rate of a video transcoder of the present invention, the step of generating a quantization parameter of MPEG-4 includes: setting an initial value of a control parameter; determining a quantization parameter of a target MPEG-1 by adopting a logarithmic R-Q model to a quantization parameter of MPEG-1; adjusting the quantization parameter of the target MPEG-1 by using a correction parameter of a coding efficiency between MPEG-1 and MPEG-4; and outputting the quantization parameter of MPEG-4 by adopting a gradual approach function to the adjusted quantization parameter; and updating a control parameter when one picture is completely processed.

To achieve at least these advantages in whole or in parts, there is further provided a method for adaptively controlling a bit rate of a video transcoder including the steps of: setting an initial value of a control parameter; determining a quantization parameter of a target MPEG-1 by adopting a logarithmic R-Q model to a quantization parameter of an input MPEG-1; adjusting the quantization parameter of the target MPEG-1 by using a parameter indicating a difference of a coding efficiency between MPEG-1 and MPEG-4; calculating a quantization parameter of an output MPEG-4 by adopting a gradual approach function to the adjusted quantization parameter of the target MPEG-1; calculating a difference between a target bit count for each picture and an actually generated bit count and feeding back the difference to the quantization parameter determining step; and updating a control parameter when one picture is completely processed.

To achieve at least these advantages in whole or in parts, there is further provided an apparatus for adaptively controlling a bit rate of a video transcoder including: a logarithmic R-Q modeling unit for outputting a quantization parameter of a target MPEG-1 by adopting a logarithmic R-Q model to a quantization parameter of an input MPEG-1; a quantization parameter adjusting unit for adjusting a quantization parameter of the target MPEG-1 with a correction parameter of a coding efficiency; quantization parameter determining unit for outputting a quantization parameter of an output MPEG-4 by adopting an gradual approach function to the adjusted quantization parameter of the target MPEG-1; and bit count computing unit for calculating a bit count difference between the nth picture of the target MPEG-1 and that of the output MPEG-4, and feeding back the bit count difference to the logarithmic R-Q modeling unit.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

The present invention proposes a logarithmic R-Q model adaptively obtaining R-Q characteristics suitable for characteristics of an input image and a method for adaptively changing a parameter ($\beta$) compensating a coding efficiency difference between MPEG-1 and MPEG-4 suitable to characteristics of an image, rather than fixing it to a particular value. On the basis of this concepts, a bit rate is adaptively controlled when a bit stream of MPEG-1 is converted into a bit stream of MPEG-4.

1) Logarithmic R-Q Model 1N order to obtain a logarithmic R-Q model, an experiment was done for a distribution of bit generation amount according to various quantization parameter ($Q_P$) values by using some test images, such as 'mobile', 'flower', football' and 'miss America'.

Figure 3:
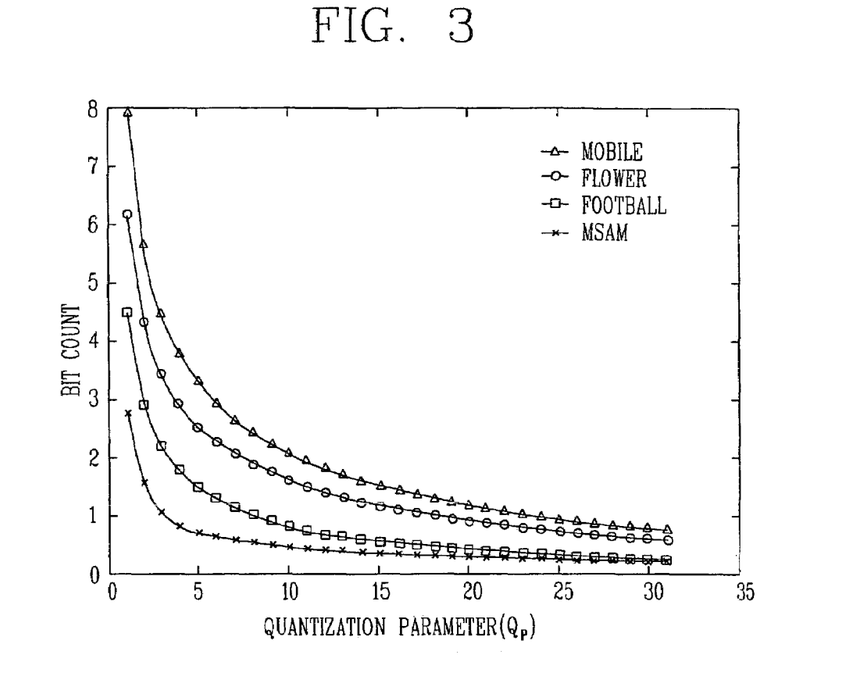
FIG. 3 is a graph showing a distribution of a bit generation amount when a plurality of test images are coded to an I-picture by using a quantization parameter ($Q_P$)
Figure 4:
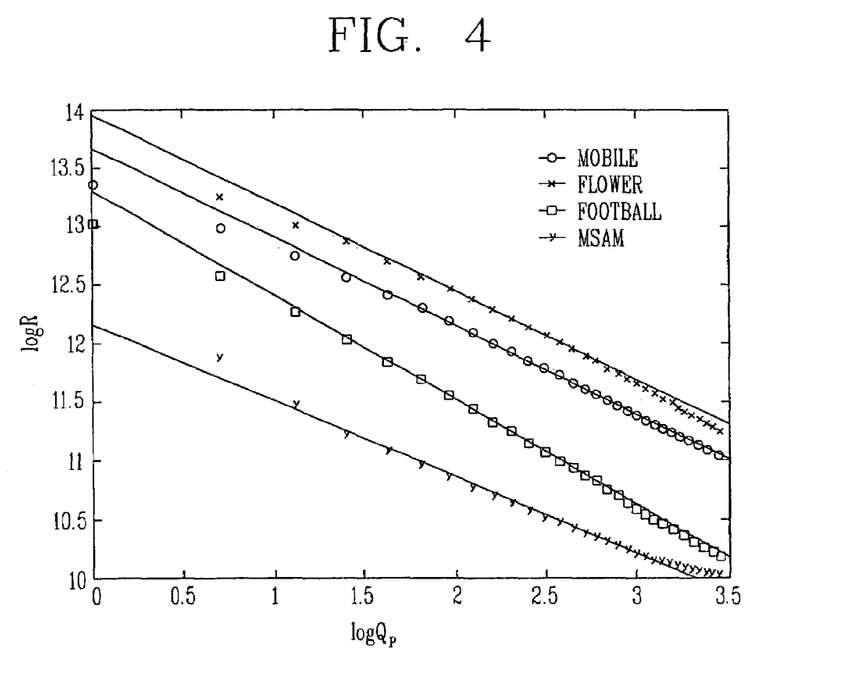
FIG. 4 is a graph showing a logarithmic R-Q relation obtained by converting the distribution characteristics illustrated in FIG. 3 to a logarithmic scale.
Figure 5:
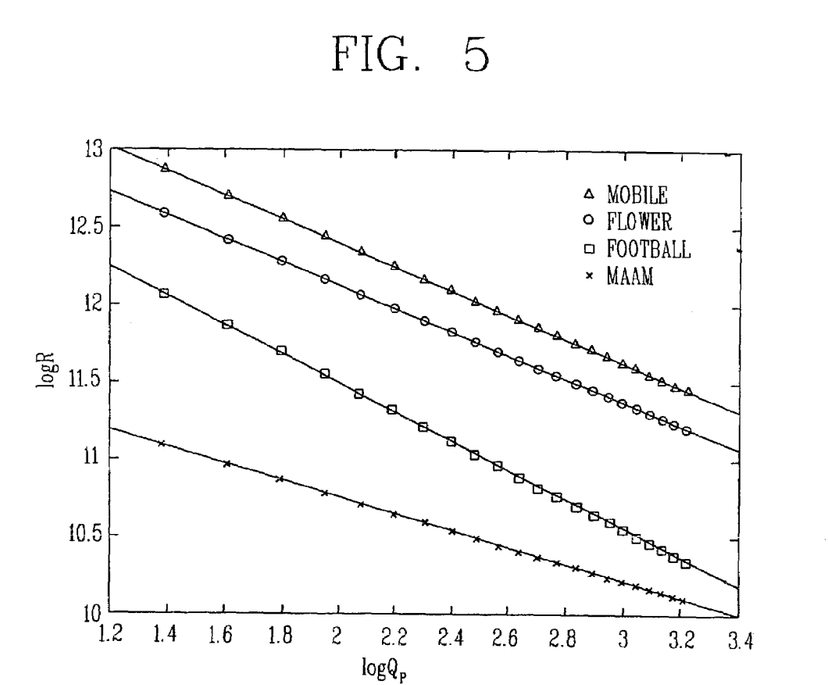
FIG. 5 is a graph showing a logarithmic R-Q relatoin when the quantization parameter ($Q_P$) is limited to 4–25 range.

FIG. 3 is a graph showing a distribution of a bit generation amount when a plurality of test images are coded to an I-picture by using a quantization parameter ($Q_P$);

Conversion of the distribution characteristics into a logarithmic scale exhibits linear characteristics in the relation between log $Q_P$ and log R as shown in FIG. 4. Especially, in case of limiting the range of $Q_P$ value to 4–25, the linear characteristics of the relation between log $Q_P$ and log R are more remarkable as shown in FIG. 5.

Figure 6:
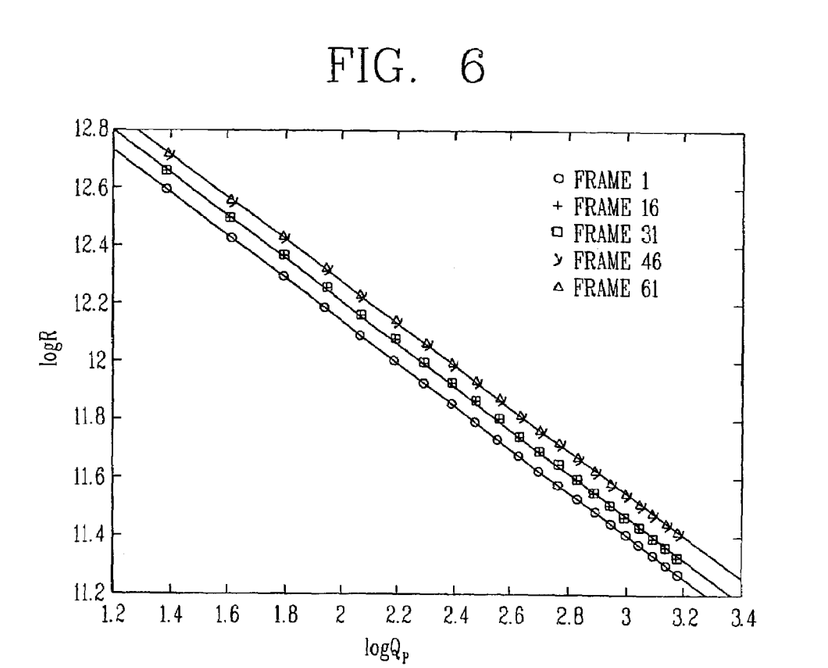
FIG. 6 is a graph showing a logarithmic R-Q relation for several I-pictures of an image of 'flower'.

FIG. 6 is a graph showing a logarithmic R-Q relation for several I-pictures of an image of 'flower'.

Especially, FIG. 6 shows a result after observation on the relation between log $Q_P$ and log R when first, 16th, $31^{st}$, $46^{th}$, $61^{st}$ images of 'flower' were coded to I-picture while changing the value $Q_P$ from 4 to 25.

As noted in FIG. 6, the linear slopes are almost the same for each picture of the same test images. This is because the characteristics of the picture are similar to each other as the image of 'flower' has camera panning characteristics. Thus, if the characteristics of the image is not rapidly changed, the slope values of each image would be similar to each other.

Figure 7:
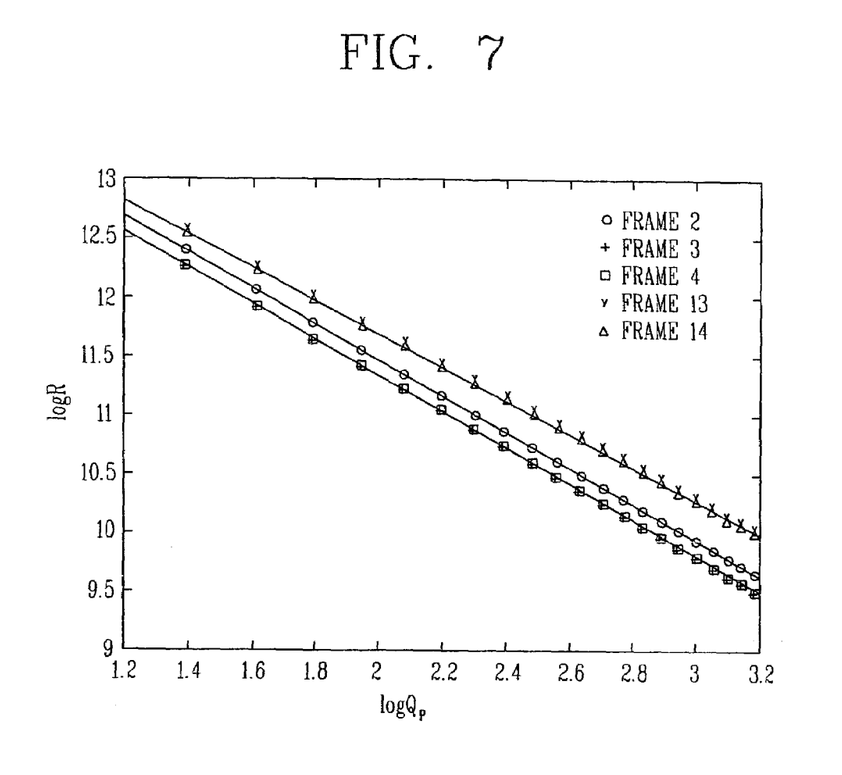
FIG. 7 is a graph showing a logarithmic R-Q relation for several P-pictures of an image of 'flower'.

FIG. 7 shows a result after observation on the relation between log $Q_P$ and log R when the second, third, fourth, 13th, and $14^{th}$ images of 'flower' were coded to P-picture while changing the value $Q_P$ from 4 to 25. As shown in FIG. 7, the result of P-picture exhibits linear characteristics like that of I-picture. On the basis of the experimental results, the relation between log $Q_P$ and log R can be expressed by the following linear equation (1):

$$\log R = \delta - \gamma \log Q_P, \quad 4 \le Q_P < 25 \qquad (1)$$

The above equation is called logarithmic R-Q model. In equation (1), $\delta$ and $\gamma$ are model parameters and $\delta$ is a constant.

In equation (1), $Q_P$ is limited from 4 to 25 in its range. $Q_P$ values used in a general image coding mostly belong to the range (4–25). Thus, limitation to the range of $Q_P$ value does not cause a restriction or a problem.

Equation (1) can be expressed by the following equation (2):

$$R = \frac{e^\delta}{Q_p^\gamma}, \quad 4 \le QP \le 25 \qquad (2)$$

wherein, 'R' is a bit rate.

2) Gradual Approach Function (GAF)

The gradual approach function (GAF) has been devised in order to consider the difference in the transmission method of quantization parameter between MPEG-1 and MPEG-4. In MPEG-1, there is no restriction between the difference between the quantization parameter values of neighboring macro blocks. But in case of MPEG-4, there is a restriction that the difference between the quantization parameter values should not exceed ±2. Thus, this problem can be solved by using the following GAF:

$$\begin{aligned} Q_2(n, m) &= G[Q'_1(n, m), Q_2(n, m-1)] \qquad (3) \\ &= Q_2(n, m-1) - 2 \quad Q_1(n, m) < Q_2(n, m-1) - 2, \\ &= Q_1(n, m) \text{ if } Q_2(n, m-1) - \\ &\quad 2 \le Q_1(n, m) \le Q_2(n, m-1) + 2, \\ &= Q_2(n, m-1) + 2 \quad Q_1(n, m) > Q_2(n, m-1) + 2 \end{aligned}$$

wherein $Q_1(n,m)$ signifies a quantization parameter value assigned to the mth macro block of the nth picture of MPEG-1, and $Q_2(n,m)$ signifies a quantization parameter value assigned to the mth macro block of the nth picture of MPEG-4.

Figure 8:
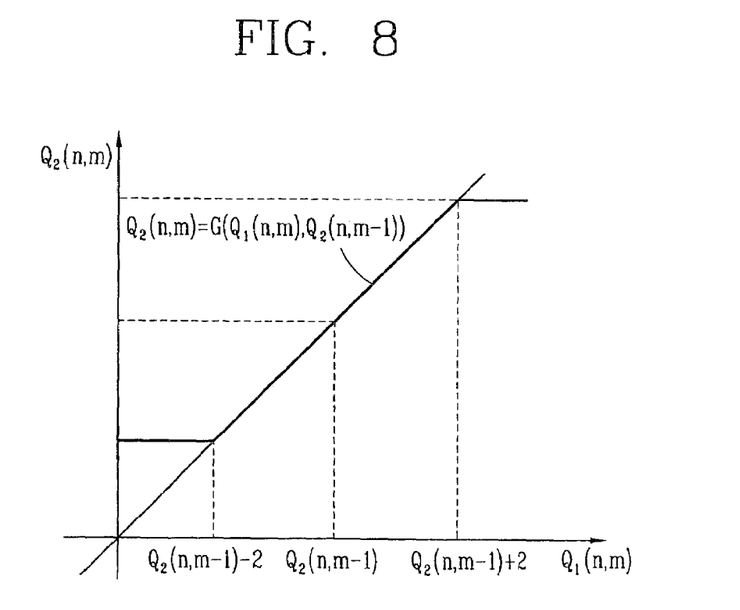
FIG. 8 is a graph showing a different gradual approach function (GAF) in accordance with the present invention.

This relation can be shown as a graph illustrated in FIG. 8.

Figure 9:
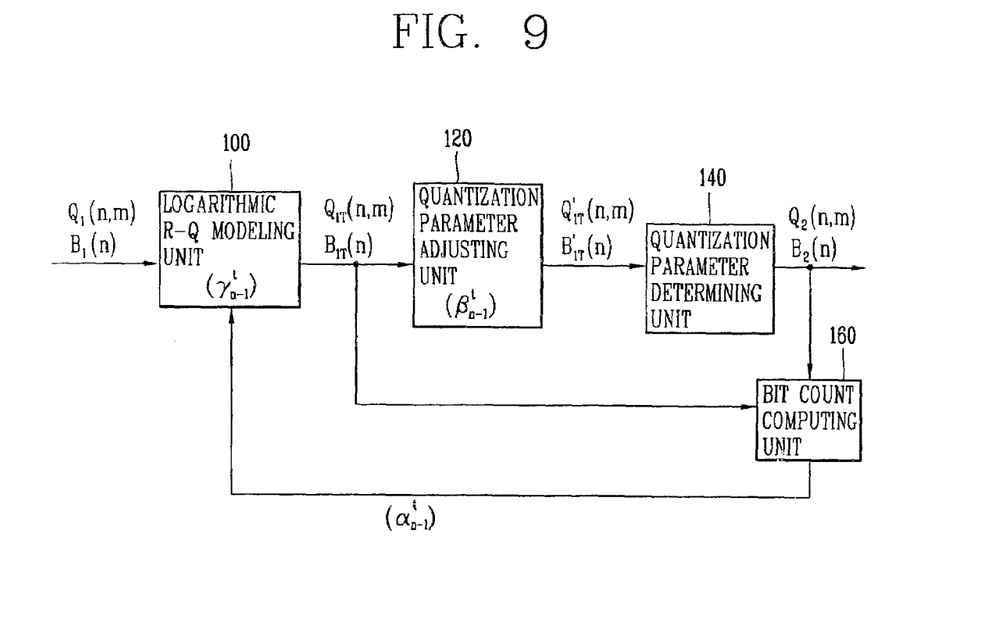
FIG. 9 illustrate a detail construction of a bit rate controller in accordance with the present invention.

FIG. 9 illustrate a detail construction of a bit rate controller in accordance with the present invention.

With reference to FIG. 9, another bit rate controller of the present invention includes a logarithmic R-Q modeling unit 100, a quantization parameter adjusting unit 120, a quantization parameter determining unit 140 and a bit count computing unit 160.

The logarithmic R-Q modeling unit 100 outputs a quantization parameter [$Q_{1T}(n,m)$] of a target MPEG-1 by adopting a logarithmic R-Q model obtained adaptively according to characteristics of an image to the quantization parameter [$Q_1(n,m)$] of MPEG-1.

The quantization parameter adjusting unit 120 calculates an adjusted quantization parameter [$Q]'_{1T}(n,m)$] by adopting a variable parameter ($\beta$) according to image characteristics to the quantization parameter [$Q]_{1T}(n,m)$] outputted from the logarithmic R-Q modeling unit 100.

The quantization parameter determining unit 140 finally generates a quantization parameter [$Q_2(n,m)$] for MPEG-4 by adopting a gradual approach function (GAF) to the adjusted quantization parameter [$Q'_{1T}(n,m)$].

The bit count computing unit 160 calculates a bit count difference between nth picture of the target MPEG-1 and that of the output MPEG-4, and feeding back the bit count difference to the logarithmic R-Q modeling unit 100.

The operation of the bit rate controller in accordance with the present invention will now be described in detail.

With reference to FIG. 9, 'n' is an index indicating an order of pictures and n-1 indicates the latest picture with the same time (I or P) as that of the nth picture. That is, for example, in case of an IPPPPPPI, since the current nth picture is I picture, the n-1th picture is the I picture positioned at the forefront, not the P picture.

$Q_1(n,m)$, $Q_{1T}(n,m)$ and $Q_2(n,m)$ indicate quantization parameters of the input MPEG-1, the target MPEG-1 and the output MPEG-4, respectively. $B_1(n)$, $B_{1T}(n)$ and $B_2(n)$ indicate the bit count of nth picture of the input MPEG-1, the target MPEG-1 and the output MPEG-4, respectively.

$Q'_{1T}(n,m)$ is a value obtained by adjusting $Q_{1T}(n,m)$ by using $\beta_n^t$ value, and $B'_{1T}(n)$ is a value obtained by adjusting $B_{1T}(n)$ by using $\beta_n^t$ value, In addition, control parameters such as $\alpha_n^t$, $\beta_n^t$ and $\gamma_n^t$ are used to control the bit rate. At this time, 't' indicates a type of the picture being currently processed and $t \in \{1,P\}$.

$\alpha_n^t$, a correction parameter, is a value obtained by subtracting an actually generated bit count of MPEG-4 from the target bit count of MPEG-1 and defined by the following equation (4):

$$\alpha_n^t = B_{1T}(n) - B_2(n) \quad (4)$$

$\beta_n^t$, a correction parameter of a coding efficiency in consideration of coding efficiency difference between MPEG-1 and MPEG-4 and defined by the following equation (5).

$$\beta_n^t = \frac{B_2(n)}{B'1T(n)} \quad (5)$$

wherein $\beta_n^t$ is always smaller than '1', existing between 0.8 and 0.95.

$\gamma_n^t$ is a model parameter obtained by the logarithmic R-Q model illustrated in equation (1).

B1T(n) can be obtained by using the bit rate (R1) of the input MPET-1, the bit rate (R2) of the output MPEG-4 and $\alpha_{n-1}^t$, as follows:

$$B_{1T}(n) = B_1(n)\frac{R_2}{R_1} + \alpha_{n-1}^t \quad (6)$$

Thus, when the quantizaiton parameter $[Q_1(n,m)]$ of MPEG-1 is inputted, the logarithmic R-Q modeling unit 100 obtains the quantization parameter $[Q_{1T}(n;m)]$ of MPEG-1 by using R1, $\alpha_{n-1}^t$, $\gamma_{n-1}^t$ and equation (2) as follows:

$$Q_{1T}(n, m) = \left\{\frac{R_1}{R_2 + FR \cdot \alpha_{n-1}^t}\right\}^{\frac{1}{\gamma_{n-1}^t}} \cdot Q_1(n, m), t \in \{I, P\} \quad (7)$$

At this time, 'FR' is a frame rate.

Once the $Q_{1T}(n,m)$ of the target MPEG-1 is determined, in order to consider the coding efficiency difference between MPEG-1 and MPEG-4, the quantization parameter adjusting unit 120 obtains $Q'_{1T}(n,m)$ by adopting $\beta_{n-1}^t$ to $Q_{1T}(n,m)$.

$$Q'_{1T}(n, m) = (\beta_{n-1}^t)^{\frac{1}{\gamma_{n-1}^t}} \cdot Q_{1T}(n, m) \quad (8)$$

The target quantization parameter outputting unit 140 obtains the quantization parameter $[Q_2(n,m)]$ of the output MPEG-4 by using equation (3), the GAF method:

$$Q_2(n,m) = G[Q'_{1T}(n,m), Q_2(n,m-1)] \quad (9)$$

At this time, the bit count computing unit 160 calculates $\alpha_{n-1}^t$ indicating the difference between the bit count of the nth picture of the target MPEG-1 and the bit amount of the nth picture of the output MPEG-4 and feeds it back to the logarithmic R-Q modeling unit 100.

Then, the bit rate controller 140 outputs the quantization parameter $[Q_2(n,m)]$ of MPEG-4 which reflects the characteristics of the image to the quantizer.

Figure 10:
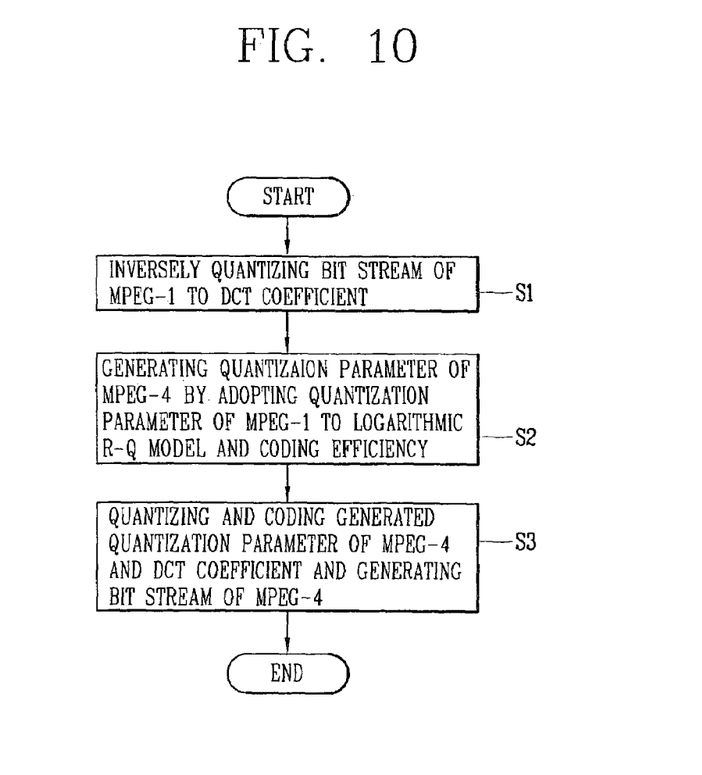
FIG. 10 is a flow chart of a method for controlling a bit rate of a different video transcoder in accordance with the present invention.

FIG. 10 is a flow chart of a method for controlling a bit rate of a video transcoder in accordance with the present invention. As the video transcoder in this respect, the conventional video transcoder as illustrated in FIG. 1 is adopted.

As shown in FIG. 10, a bit stream of MPEG-1 is converted into a DCT coefficient by using the VLD 10, the inverse quantizer 12 and the adder 14 (step S1).

Meanwhile, in the present invention, the quantization parameter $[Q_2(n,m)]$ of MPEG-4 is generated by adopting the logarithmic R-Q model, the difference of the coding efficiency and the GAF to the quantization parameter $[Q_1(n,m)]$ for MPEG-1 (step S2).

After the DCT coefficient and the quantization parameter $[Q_2(n,m)]$ of MPET-4 are generated, the quantizer 16 quantizes the two values and then the VLD 18 codes them, thereby generating a bit stream of the target MPEG-4 with a desired bit rate (step S3).

Figure 11:
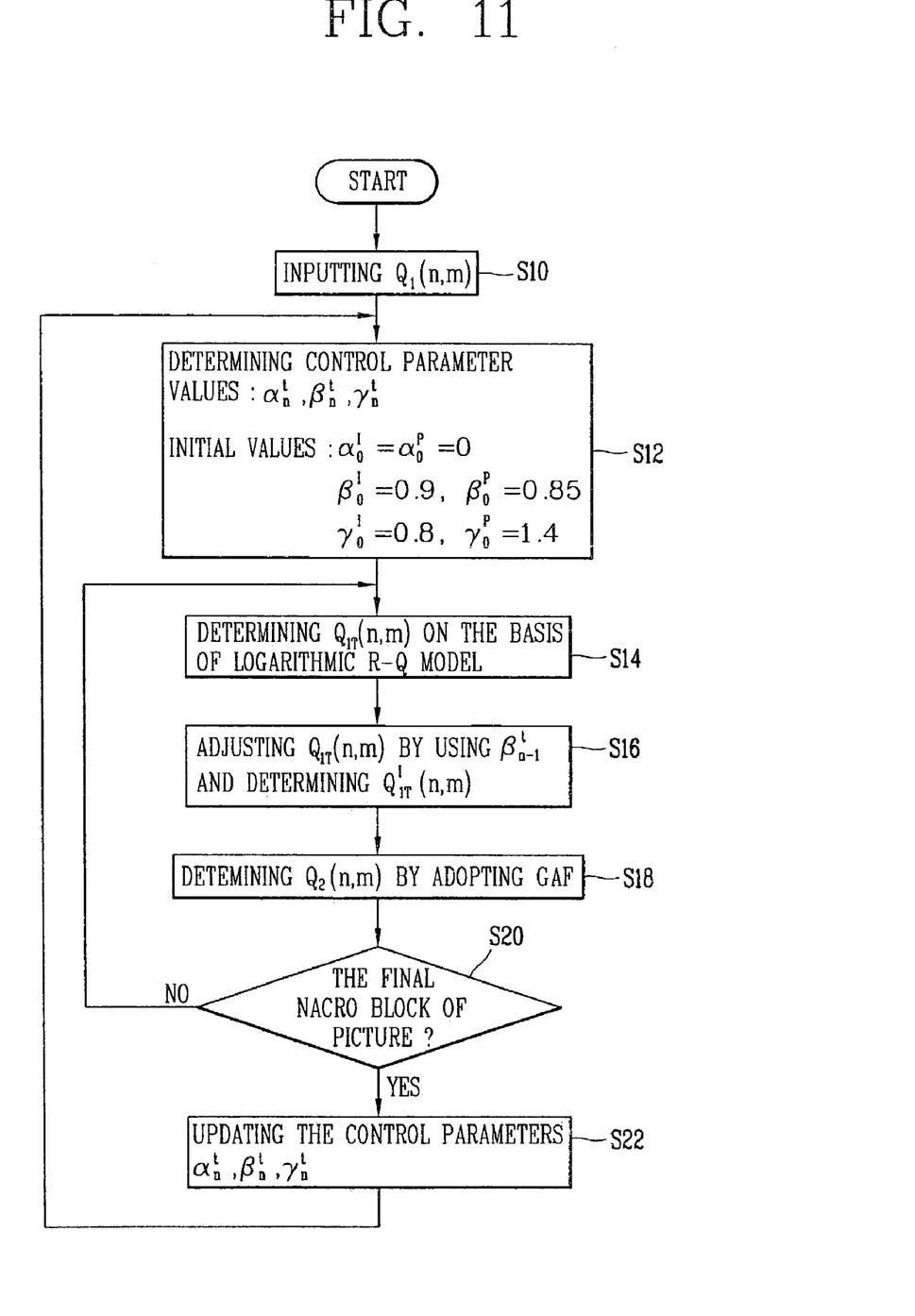
FIG. 11 is a detailed flow chart of a process of generating a quantization parameter of MPEG-4 of FIG. 10.

Thereafter, with reference to FIG. 11, the step (S2) of generating the quantization parameter of MPET-4 will now be described in detail.

When a picture of the bit stream of MPEG-1 with a bit rate of R1 is inputted (step S10), the bit rate controller determines an initial value of the control parameters ($\alpha_n^t$, $\beta_n^t$ and $\gamma_n^t$) (step S12). At this time, the initial value of the control parameters are experimentally determined as $\alpha_0^t = \alpha_0^P = 0$, $\beta_0^t = 0.9$, $\beta_0^P = \gamma_0^t = 0.8$, $\gamma_0^P = 1.4$.

When the initial value of the parameters $\alpha_n^t$, $\beta_n^t$ and $\gamma_n^t$ are set, the bit rate controller determines the target quantization parameter $[Q_{1T}(n,m)]$ of MPEG-1 on the basis of the logarithmic R-Q model (step S14). In addition, the bit rate controller determines the $Q'_{1T}(n,m)$ by adjusting the target quantization parameter $[Q_{1T}(n,m)]$ with $\beta_{n-1}^t$ in order to consider the coding efficiency difference between MPET-1 and MPEG-4 (step S16).

Once $Q'_{1T}(n,m)$ is determined, the bit rate controller finally obtains the quantization parameter $[Q_2(n,m)]$ of MPEG-4 by adopting the GAF method (step S18).

After the above process is performed on the every macro block in one picture, the bit rate controller updates the control parameter to be used in the picture of the same type.

That is, when the quantization parameter $[Q_2(n,m)]$ of MPEG-4 for the macro block is determined, the bit rate controller checks whether the process has been completed on the last macro block of the picture, that is, one frame (one picture (step S20).

Upon checking, if the process for one frame has not been completed, the operation after the step S14 is repeatedly performed. If the process for one frame is completed, the value of the control parameters $\alpha_n^t$, $\beta_n^t$ and $\gamma_n^t$ are updated (step S22) and the operation after the step S12 is performed on the next frame. At this time, the control parameters $\alpha_n^t$, $\beta_n^t$ and $\gamma_n^t$ are updated by the following equation (10):

$$\alpha_n^t = B_{1T}(n) - B_2(n) \qquad (10)$$

$$\beta_n^t = \frac{B_2(n)}{B_{1T}(n)} \cdot \beta_{n-1}^t \qquad (11)$$

$$\gamma_n^t = \frac{\log B_1(n) - \log B_2(n)}{\log \overline{Q}_{1T}(n) - \log \overline{Q}_1(n)} \qquad (12)$$

In equation (12), $$\overline{Q}_1(n) = \frac{1}{M} \sum_{m=0}^{M-1} Q_1(n,m), \text{ and } \overline{Q}_{1T}(n) = \frac{1}{M} \sum_{m=0}^{M-1} Q_{1T}(n,m),$$

and 'M' signifies the number of macro blocks in the picture.

The control parameters updated through equations 10~12 are used is again to control the bit rate for a picture with the same type to be processed next time.

Accordingly, the quantizer of the video transcoder quantizes the MPEG-4 by using the quantization parameter $[Q_2(n,m)]$ of MPEG-4 outputted from the bit rate controller.

In general, the criterion for measuring the bit rate control performance of the video transcoder can be divided into three ones.

First, the buffer should not overflow or underflow in the video transcoder or a decoder of a receiving party. Secondly, a bit rate of the bit stream of the outputted MPEG-4 should be identical to a target bit rate. Finally, the picture quality of the bit stream of the outputted MPEG-4 should be good.

The performance of another bit rate controlling method of the present invention was analyzed through experiment as follows.

First, the state of the decoder buffer of the receiving party in the first experiment is compared with the performance of the method proposed in the ICME 2001. The test image is 'football' image and it is assumed that a bit rate of an input MPEG-1 of the video transcoder is 2 mbps and a bit rate of an output MPEG-4 is 1 Mbps.

Figure 12A:
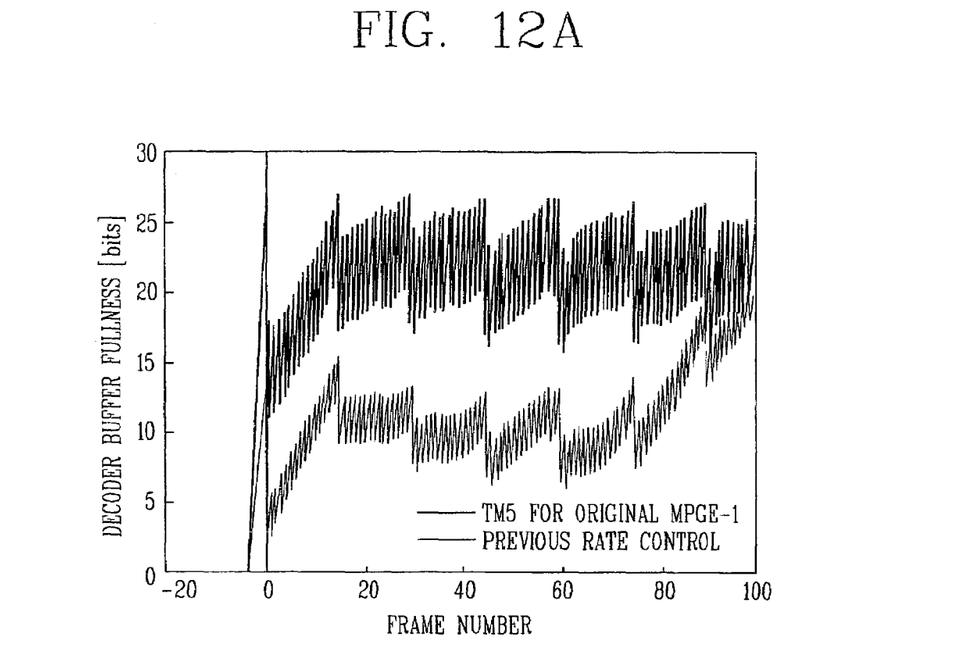
FIG. 12A is a graph showing a state experimental result of a decoder buffer in accordance with a conventional bit rate controlling method.
Figure 12B:
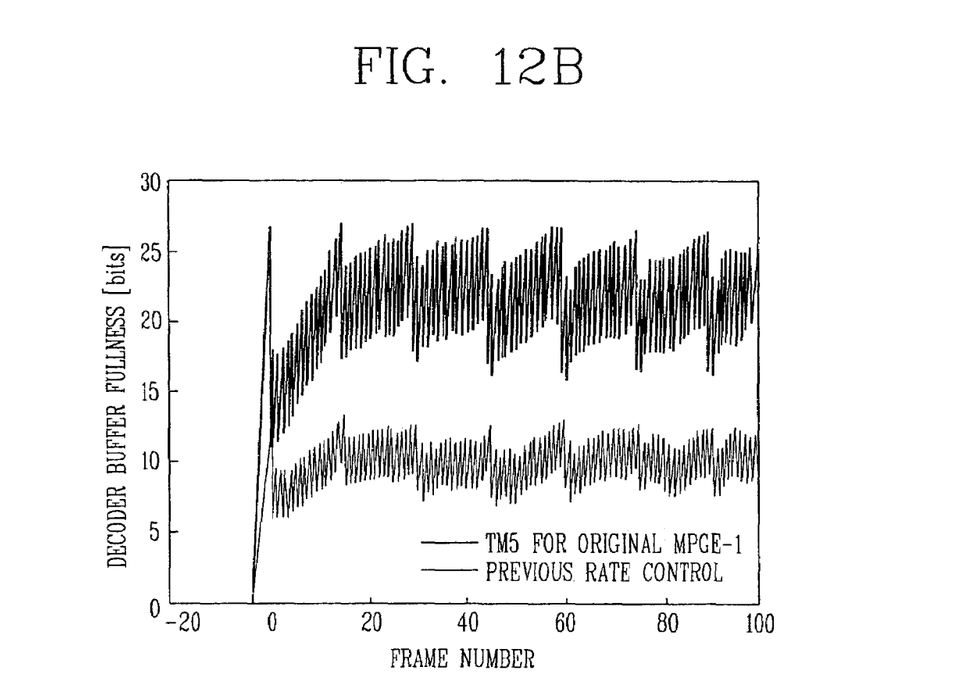
FIG. 12B is a graph showing a state experimental result of a decoder buffer in accordance with a bit rate controlling method of the present invention.

FIG. 12A shows a state of the decoder buffer when adopting the method proposed in the ISME 2001. It is noted that the buffer overflows as the data collected in the buffer rapidly increased. Meanwhile, as shown in FIG. 12, in case of adopting the method devised in the present invention, it is noted that the state of the buffer is stably controlled.

In the second experiment, a picture quality and an accuracy of the bit rate control are compared.

Figure 13A:
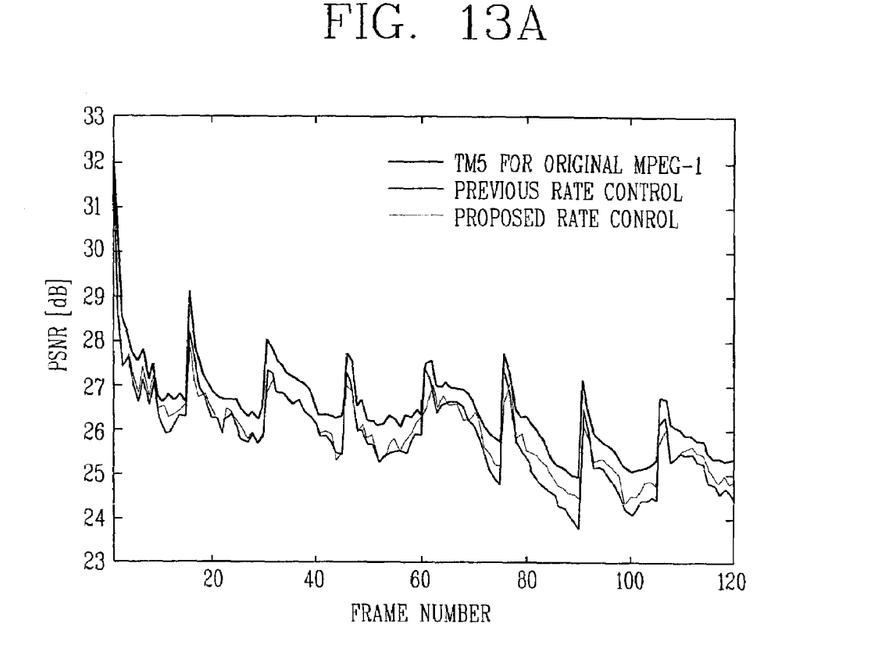
FIG. 13A is a graph showing a comparison of PSNR picture quality by pictures between a bit rate control method for an image of 'football' in accordance with the conventional art and the present invention.

FIG. 13A shows comparison of a PSNR (Peak Signal-to-Noise ratio) performance by pictures in case of performing a bit rate controlling with 1 Mbps on an image of 'football' coded with 2 Mbps in the video transcoder. At this time, the result (upper bound) existing at the uppermost is a result when an original image which has not undergone transcoding is coded to the MPEG-1 with 1 Mbps and is not subjected to the comparison.

From the result of FIG. 13, it is noted that the picture quality (PSNR) by the bit rate controlling as devised in the present invention is superior to the picture quality according to the existing bit rate controlling method.

Figure 13B:
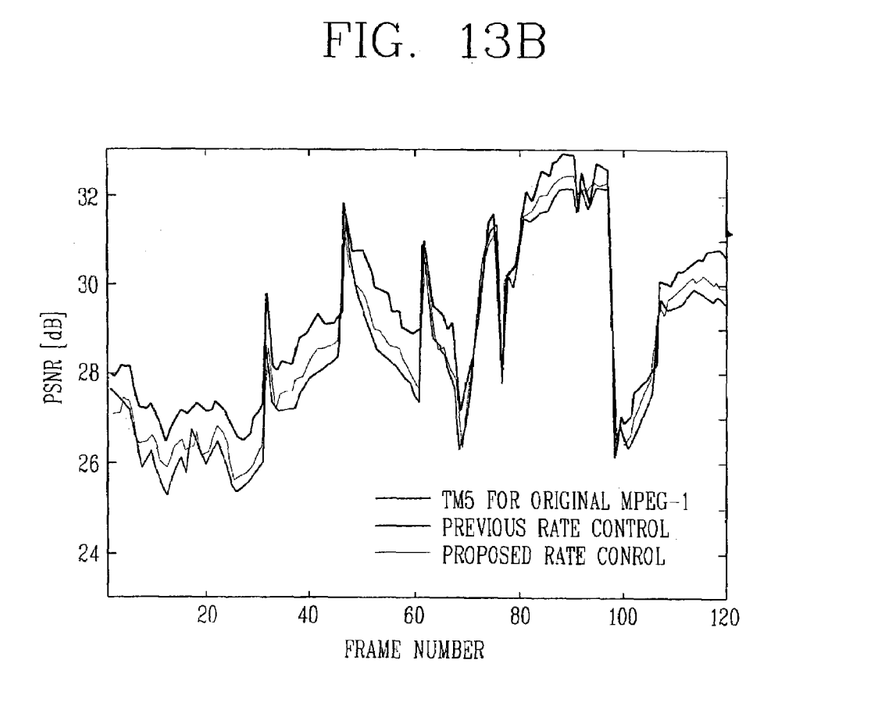
FIG. 13B is a graph showing a comparison of PSNR picture quality by pictures between a bit rate control method for an image of 'table tennis' in accordance with the conventional art and the present invention.

FIG. 13B shows a result of adopting the similar experiment to an image of 'table tennis'. Likewise in the experiment of FIG. 3, adopting of the bit rate controlling method of the present invention shows improvement of the picture quality. At this time, the input bit rate of the transcoder is 1.2 Mbps and the output bit rate is 0.6 Mbps.

Figure 14A:
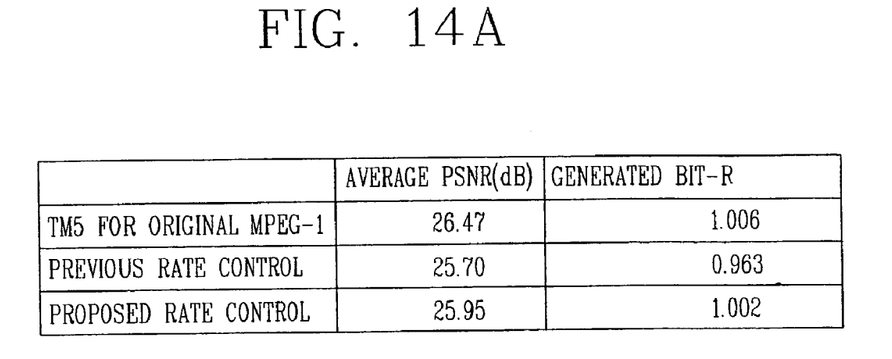
FIG. 14A illustrates an average PSNR and an accuracy of a bit rate control for an image of a 'football' in accordance with the conventional art and the present invention.
Figure 14B:
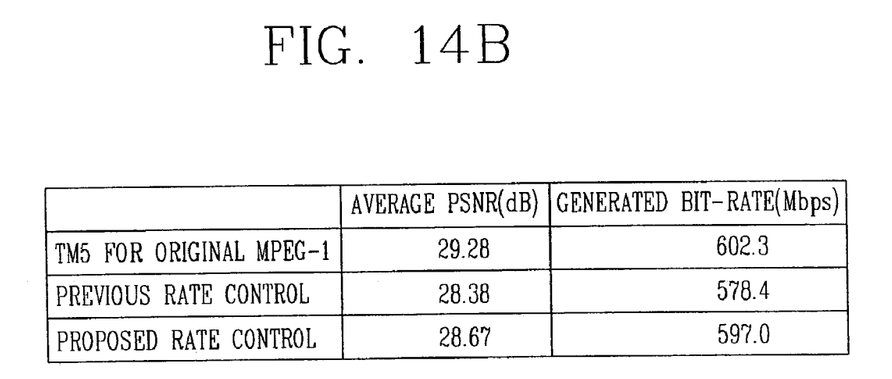
FIG. 14B illustrates an average PSNR and an accuracy of a bit rate control for an image of a 'table tennis' in accordance with the conventional art and the present invention.

FIGS. 14A and 14B show the comparison of the average PSNR and the accuracy of the output bit rate obtained through the experiments of FIGS. 13A and 13B with the existing result.

As shown in FIG. 14A, it is noted that, for the image of 'football', the method of the present invention exhibits an improvement of the picture quality by about average 0.25 dB compared to that of the existing method, and the bit rate controlling approaches more closely to the target bit rate of 1 Mbps.

In addition, as shown in FIG. 14B, for the image of 'table tennis', the method of the present invention exhibits ah improvement of the picture quality of about average 0.29 dB compared to that of the existing method, and the bit rate controlling approaches more closely to the target bit rate of 0.6 Mbps.

Therefore, from the experimental results performed in FIGS. 14A and 14B, notably, the bit rate controlling method of the present invention is superior to the existing method in the aspect of the picture quality (PSNR) and the accuracy of the output bit rate.

As so far described, in the present invention, the logarithmic R-Q characteristics obtaining the adaptive R-Q characteristics suitable to characteristics of an inputted image are proposed, and the parameter (D) compensating the difference between the coding efficiency of MPEG-1 and the coding efficiency of MPEG-4 is not fixed as a specific value but changed adaptively according to the characteristics of an image. Accordingly, an accurate quantization parameter of MPEG-4 is generated.

Therefore, on the basis of the proposed concepts, the bit rate is adaptively controlled when the bit stream of MPEG-1 is converted into a bit stream of MPEG4, so that the picture quality (PSNR) can be heightened and more accurate output bit rate can be obtained.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for adaptively controlling a bit rate of a video transcoder comprising:

converting a bit stream of MPEG-1 into a DCT coefficient;

generating a quantization parameter of MPEG-4 by reflecting a difference of a logarithmic R-Q model and a coding efficiency for a quantization parameter of MPEG-1; and quantizing the DCT coefficient with the generated quantization parameter of MPEG-4 and outputting an MPEG-4 bit stream, wherein the logarithmic R-Q mode is defined by the following equation:

log R=δ−γlogQ$_P$, 4≤Q$_p$≤25, wherein 'R' is a rate, QP is a quantization parameter of MPEG-1, and δ and γ are model parameters.

2. The method of claim 1, wherein the generating a quantization parameter of MPEG-4 comprises:

setting an initial value of control parameters ($\alpha_n^t$, $\beta_n^t$ and $\gamma_n^t$);

determining a quantization parameter [$Q_{1T}$(n,m)] of a target MPEG-1 by adopting a logarithmic R-Q model to a quantization parameter of MPEG-1(n,m)];

adjusting the quantization parameter [$Q_{1T}$(n,m)] of the target MPEG-1 by using a correction parameter ($\beta_{n-1}^t$) of a coding efficiency;

outputting the quantization parameter [$Q_2$(n,m)] of MPEG-4 by adopting a gradual approach function to the adjusted quantization parameter [$Q_{1T}$(n,m)]; and updating a control parameter when one picture is completely processed.

3. The method of claim 2, wherein the control parameter ($\alpha_n^t$) is determined by the following equation:

$\alpha_n^t = B_{1T}(n) - B_2(n)$, wherein $B_{1T}(n)$ and $B_2(n)$ are bit count of the nth picture of the target MPEG-1 and the output MPEG-4, respectively.

4. The method of claim 2, wherein the control parameter $\beta_n^t$ is determined by the following equation:

$$\beta_n^t = \frac{B_2(n)}{B'_{1T}(n)},$$

wherein $B_{1T}^t$ is a value obtained by adjusting $B_{1T}(n)$ in consideration of $\beta_n^t$.

5. The method of claim 2, wherein the control parameter ($\gamma_n^t$) is a parameter of a logarithmic R-Q model.

6. The method of claim 2, further comprises computing a difference ($\alpha_{n-1}^t$) between the target bit count for the nth picture and an actually generated bit count for the nth picture, and feeding back the difference to the quantizaiton parameter determining.

7. The method of claim 2, wherein the quantization parameter [$Q_{1T}$(n,m)] is generated by the following equation:

$$Q_{1T}(n, m) = \left\{ \frac{R_1}{R_2 + FR \cdot \alpha_{n-1}^t} \right\}^{\frac{1}{\gamma_{n-1}^t}}.$$

$Q_1$(n,m), t∈{I,P}, wherein FR is a frame rate and $R_1$ and $R_2$ indicate a bit rate of MPEG-1 and MPEG-4, respectively.

8. The method of claim 7, wherein n−1 signifies the latest picture with the same picture type as that of the nth picture.

9. The method of claim 2, wherein the quantization parameter [$Q_{1T}$(n, m)] is generated by the following equation:

$$Q'_{1T}(n, m) = (\beta_{n-1}^t)^{\frac{1}{\gamma_{n-1}^t}} \cdot Q_{1T}(n, m)$$

10. The method of claim 2, wherein the quantization parameter [Q2(n,m)] is determined by the following gradual approach function:

$$Q_2(n, m) = G[Q'_{1T}(n, m), Q_2(n, m-1)]$$
$$= Q_2(n, m-1) - 2 \quad Q'_{1T}(n, m) < Q_2(n, m-1) - 2,$$
$$= Q'_{1T}(n, m) \text{ if } Q_2(n, m-1) -$$
$$2 \le Q'_{1T}(n, m) \le Q_2(n, m-1) + 2,$$
$$= Q_2(n, m-1) + 2 \quad Q'_{1T}(n, m) > Q_2(n, m-1) + 2$$

11. The method of claim 2, wherein the updated control parameter is used for a bit rate controlling on a picture with the same type to be processed next time.

12. The method of claim 2, wherein the control parameter is updated by the following equation:

$\alpha_n^t = B_{1T}(n) - B_2(n)$.

13. The method of claim 2, wherein the control parameter $\beta_n^t$ is updated by the following equation:

$$\beta_n^t = \frac{B_2(n)}{B'_{1T}(n)} \cdot \beta_{n-1}^t$$

14. The method of claim 2, wherein the control parameter $\gamma_n^t$ is updated by the following equation:

$$\gamma_n^t = \frac{\log B_1(n) - \log B_2(n)}{\log \overline{Q}_{1T}(n) - \log \overline{Q}_1(n)},$$

wherein $$\overline{Q}_1(n) = \frac{1}{M}\sum_{m=0}^{M-1} Q_1(n, m), \quad \overline{Q}_{1T}(n) = \frac{1}{M}\sum_{m=0}^{M-1} Q_{1T}(n, m),$$

and 'M' signifies the number of macro blocks in a picture.

15. A method for adaptively controlling a bit rate of a video transcoder comprising:

setting an initial value of control parameters ($\alpha_n^t$, $\beta_n^t$ and $\gamma_n^t$);

determining a quantization parameter [$Q_{1T}$(n,m)] of a target MPEG-1 by adopting a logarithmic R-Q model to a quantization parameter of MPEG-1 [$Q_1$(n,m)];

adjusting the quantization parameter [$Q_{1T}$(n,m)] of the target MPEG-1 by using a correction parameter ($\beta_{n-1}^t$) of a coding efficiency;

outputting the quantization parameter [$Q_2$(n,m)] of MPEG-4 by adopting a gradual approach function to the adjusted quantization parameter [$Q_{1T}$(n,m)];

computing a difference ($\alpha_{n-1}^t$) between the target bit count for each picture and an actually generated bit count and feeding back the difference to the c1quantization parameter determining; and updating a control parameter when one picture is completely processed.

16. The method of claim 15, wherein the logarithmic R-Q model is defined by the following equation: log R=δ−γ log Q$_P$, 4 ≤Q$_P$≤25 wherein 'R' is a rate, Q$_P$ is a quantization parameter of MPEG-1, and δ and γ are model parameters.

17. The method of claim 15, wherein the control parameter ($\alpha_n^t$) is determined by the following equation:
$\alpha_n^t = B_{1T}(n) - B_2(n)$, wherein $B_{1T}(n)$ and $B_2(n)$ are bit count of the nth picture of the target MPEG-1 and the output MPEG-4, respectively.

18. The method of claim 15, wherein the control parameter $\beta_n^t$ is determined by the following equation:

$$\beta_n^t = \frac{B_2(n)}{B'_{1T}(n)},$$

wherein $B'_{1T}^t$ is a value obtained by adjusting $B_{1T}(n)$ in consideration of $\beta_n^t$.

19. The method of claim 15, wherein the control parameter ($\gamma_n^t$) is a parameter of a logarithmic R-Q model.

20. The method of claim 15, wherein the quantization parameter [$Q_{1T}(n, m)$] is generated by the following equation:

$$Q_{1T}(n, m) = \left\{ \frac{R_1}{R_2 + FR \cdot \alpha_{n-1}^t} \right\}^{\frac{1}{\gamma_{n-1}^t}} \cdot Q_1(n, m), t \in \{I, P\},$$

wherein FR is a frame rate and $R_1$ and $R_2$ indicate a bit rate of MPEG-1 and MPEG-4, respectively.

21. The method of claim 20, wherein n−1 signifies the latest picture with the same picture type as that of the nth picture.

22. The method of claim 15, wherein the quantization parameter [$Q'_{1T}(n, m)$] is generated by the following equation:

$$Q'_{1T}(n, m) = (\beta_{n-1}^t)^{\frac{1}{\gamma_{n-1}^t}} \cdot Q_{1T}(n, m)$$

23. The method of claim 15, wherein the quantization parameter [$Q_2(n, m)$] is determined by the following gradual approach function:

$$\begin{aligned}Q_2(n, m) &= G[Q'_{1T}(n, m), Q_2(n, m-1)] \\ &= Q_2(n, m-1) - 2 \quad Q'_{1T}(n, m) < Q_2(n, m-1) - 2, \\ &= Q'_{1T}(n, m) \text{ if } Q_2(n, m-1) - \\ &\quad 2 \leq Q'_{1T}(n, m) \leq Q_2(n, m-1) + 2, \\ &= Q_2(n, m-1) + 2 \quad Q'_{1T}(n, m) > Q_2(n, m-1) + 2\end{aligned}$$

24. The method of claim 15, wherein the updated control parameter is used for a bit rate controlling on a picture with the same type to be processed next time.

25. The method of claim 15, wherein the control parameter ($\alpha_n^t$) is updated by the following equation:
$\alpha_n^t = B_{1T}(n) - B_2(n)$.

26. The method of claim 15, wherein the control parameter ($\gamma_n^t$) is updated by the following equation:

$$\beta_n^t = \frac{B_2(n)}{B'_{1T}(n)} \cdot \beta_{n-1}^t$$

27. The method of claim 16, wherein the control parameter ($\gamma'_n$) is updated by the following equation:

$$\gamma_n^t = \frac{\log B_1(n) - \log B_2(n)}{\log \overline{Q}_{1T}(n) - \log \overline{Q}_1(n)},$$

wherein $$\overline{Q}_1(n) = \frac{1}{M} \sum_{m=0}^{M-1} Q_1(n, m),$$

$$\overline{Q}_{1T}(n) = \frac{1}{M} \sum_{m=0}^{M-1} Q_{1T}(n, m),$$

and 'M' signifies the number of macro blocks in a picture.

28. An apparatus for adaptively controlling a bit rate of a video transcoder comprising:
a logarithmic R-Q modeling unit for outputting a quantization parameter [$Q_{1T}(n, m)$] of a target MPEG-1 by adopting a logarithmic R-Q model to a quantization parameter [$Q_1(n,m)$] of an input MPEG-1;
a quantization parameter adjusting unit for adjusting the quantization parameter [$Q_{1T}(n,m)$] with a correction parameter of a coding efficiency and calculating a quantization parameter [$Q'_{1T}(n,m)$];
a quantization parameter determining unit for outputting a quantization parameter [$Q_2(n,m)$] of MPEG-4 by adopting an gradual approach function to the quantization parameter [$Q'_{1T}(n,m)$]; and
a bit count computing unit for calculating a bit count difference between the nth picture of the target MPEG-1 and that of the output MPEG-4, and feeding back the bit count difference to the logarithmic R-Q modeling unit.

29. The apparatus of claim 28, wherein the logarithmic R-Q modeling unit generates the quantization parameter [$Q_{1T}(n,m)$] of the target MPEG-1 by the following equation:

$$Q_{1T}(n, m) = \left\{ \frac{R_1}{R_2 + FR \cdot \alpha_{n-1}^t} \right\}^{\frac{1}{\gamma_{n-1}^t}} Q_1(n, m), t \in \{I, P\},$$

wherein FR is a frame rate and $R_1$ and $R_2$ indicate a bit rate of MPEG-1 and MPEG-4, respectively.

30. The method of claim 28, wherein n−1 signifies the latest picture with the same picture type as that of the nth picture.

31. The method of claim 28, wherein the quantization parameter adjusting unit generates the quantization parameter [$Q'_{1T}(n,m)$] by the following equation:

$$Q'_{1T}(n, m) = (\beta_{n-1}^t) \frac{1}{\gamma_{n-1}^t} \cdot Q_{1T}(n, m)$$

32. The method of claim 28, wherein the quantization parameter [$Q_2(n,m)$] is determined by the following gradual approach function:

$$\begin{aligned}Q_2(n, m) &= G[Q'_{1T}(n, m), Q_2(n, m-1)] \\ &= Q_2(n, m-1) - 2 \quad Q'_{1T}(n, m) < Q_2(n, m-1) - 2, \\ &= Q'_{1T}(n, m) \text{ if } Q_2(n, m-1) - 2 \leq Q'_{1T}(n, m) \leq Q_2(n, m-1) + 2, \\ &= Q_2(n, m-1) + 2 \quad Q'_{1T}(n, m) > Q_2(n, m-1) + 2\end{aligned}$$

* * * * *